United States Patent
Zhang et al.

(10) Patent No.: US 7,778,270 B1
(45) Date of Patent: Aug. 17, 2010

(54) CODE-SWITCHING IN WIRELESS MULTI-HOP NETWORKS

(75) Inventors: Yongguang Zhang, Moorpark, CA (US); Mohiuddin Ahmed, Moorpark, CA (US)

(73) Assignee: HRL Laboratories, LLC, Malibu, CA (US)

( * ) Notice: Subject to any disclaimer, the term of this patent is extended or adjusted under 35 U.S.C. 154(b) by 852 days.

(21) Appl. No.: 11/217,215

(22) Filed: Aug. 31, 2005

(51) Int. Cl.
*H04B 7/216* (2006.01)

(52) U.S. Cl. .................. 370/441; 370/335; 370/342

(58) Field of Classification Search .............. 370/441, 370/335, 342, 320
See application file for complete search history.

(56) References Cited

U.S. PATENT DOCUMENTS

| | | | | |
|---|---|---|---|---|
| 5,432,814 A * | 7/1995 | Hasegawa | ............... | 375/133 |
| 5,590,160 A * | 12/1996 | Ostman | ............... | 375/367 |
| 6,621,805 B1 * | 9/2003 | Kondylis et al. | ............... | 370/329 |
| 7,024,113 B2 * | 4/2006 | Miyabe | ............... | 398/51 |
| 7,159,035 B2 * | 1/2007 | Garcia-Luna-Aceves et al. | . | 709/241 |
| 7,266,085 B2 * | 9/2007 | Stine | ............... | 370/252 |
| 7,330,496 B2 * | 2/2008 | Ohmi et al. | ............... | 375/130 |

OTHER PUBLICATIONS

R. L. Peterson, R. E. Ziemer, and D. E. Borth, "Introduction to Spread Spectrum Communictions," 1995, pp. 134-139, Prentice Hall, NJ, USA.
S.Verdu, Multiuser Detection, pp. 170-173, Cambridge University Press, NY, USA, year 1998.
R. G. Gallager, "Low-Density Parity-Check Codes," pp. 1-10, 1963, MA, USA.
D. Bertsekas and R. Gallagher, "Data Networks," second edition, pp. 363-378, Prentige Hall, NJ, USA, year 1992.
D. Gerakoulis and E. Geraniotis, "CDMA Access and Switching for Terrestrial and Satellite Networks," pp. 3-6, USA, year 2001.
Diakoumis Gerakoulis "CDMA Access and Switching for Terrestrial and Satellite Networks," pp. 3-6, year 2001.

* cited by examiner

*Primary Examiner*—Steven H Nguyen
*Assistant Examiner*—Alex Skripnikov
(74) *Attorney, Agent, or Firm*—Tope-McKay & Assoc.

(57) ABSTRACT

The present invention relates to the field of code-switching in multi-hop wireless networks. More specifically, the present invention pertains to a method and apparatus that uses orthogonal codes as the forwarding labels in multi-hop forwarding. The processing of the forwarding labels is done at the physical layer. Advantages include reduced processing and energy to forward a packet; reduced latency; reduced bandwidth overhead; and increased security.

9 Claims, 2 Drawing Sheets

CODE-SWITCHING IN WIRELESS MULTI-HOP NETWORKS

BACKGROUND OF THE INVENTION (1) Field of the Invention

The present invention relates to the field of code-switching in multi-hop wireless networks. More specifically, the present invention pertains to a method and apparatus that uses orthogonal codes as the forwarding labels in multi-hop forwarding.

In order to provide a frame of reference for the present invention, a few basics of networks, and wireless networks, are discussed below.

A mobile ad-hoc network (MANET) has several features, including that it can be set-up anywhere at anytime. There is no need for existing infrastructure. The communication between nodes, can be from node to node, or multi-hop where information starts at a first node, and is sent to a at least one other node en route to a destination node. MANET has many applications, such as implantation in disaster relief situations, where the current infrastructure has been disrupted, or placement in remote areas, where it is expensive to set up infrastructure.

The implantation of MANET requires different routing protocols than those of non-ad-hoc networks. For example, there is no administrator to monitor and control which node is talking to which node and when. Further, MANET implementation has other challenges, such as power consumption. One skilled in the art can appreciate that if nodes are deployed in a disaster relief area or a remote area, power is something that should not be wasted. Thus, it is desirable for each node to expend only the minimum power necessary to accomplish the task of getting information from one node to another.

Network architecture implementation on a particular node comprises several hardware and software layers. These layers are commonly referred to as Open System Interconnection (OSI) layers. These layers describe how applications running upon network-ware devices communicate with each other. The first layer, also referred to as the physical (PHY) layer, defines the physical and electrical characteristics of the network. The network interface cards (NICs) in a computer are an example of hardware which runs at the PHY layer. Essentially, they pass the strings of ones and zeros. The second layer, known as the data link layer, has a sub-layer called the medium access control (MAC) layer and defines the access strategy for sharing the physical medium. Protocols such as point-to-point protocol (PPP) operate here. The third layer, known as the network (NET) layer, provides a means for communicating open systems to establish, maintain, and terminate network connections. The interne protocol (IP) operates at this layer. The fourth layer, known as the transport layer, ensures data reliability and integrity. The transmission control protocol (TCP) operates here. The fifth layer, known as the session layer, provides for two communicating presentation entities to exchange data with each other. The sixth layer, known as the presentation layer, is where application data is either packed or unpacked. The final layer, the seventh layer known as the application layer, is where the end-user and end-application protocols, such as telnet, operate.

The need to conserve energy and reduce latency during network operations has increased with the advent of small wireless devices, such as sensor networks. Further, small wireless devices place demands on system longevity because of their limited power capabilities. Many improvements have come from minimizing the required energy per layer, but the layered OSI driven paradigm of a network (borrowed from the wired networks world) has still remained a dominant factor in the design of a wireless network. Most techniques for power-efficient network operations do not explicitly address power requirements and routing at the hardware layer itself, since the network protocols are easier to implement in software than entirely in hardware at the physical layer.

Therefore, what is needed is a technique which does not require the action of all layers of the OSI model, but instead utilizes only the physical layer when a node is merely relaying information.

Multi-hop wireless networks include mobile ad-hoc networks (MANET) and sensor networks. The networks may be static (no topology changes) or dynamic (with node mobility or environmental changes). Strictly speaking, the term "routing" is often used to mean two different concepts in networking, depending on the context: message-forwarding and network-routing. Message-forwarding refers to the process of receiving a message (packet), consulting a table (the forwarding table), and resending the message towards its destination as determined by that table. Network-routing, on the other hand, refers to the process of building the forwarding table. Message-forwarding is a well-defined process performed locally at each node, whereas network-routing involves a complex distributed decision-making process commonly referred to as the routing algorithm or the routing protocol. Although these two concepts are often mixed together in the discussions of routing in multi-hop wireless networks, these concepts are kept separate in the following description.

First, a look at forwarding in multi-hop wireless networks. There are three fundamental steps involved in forwarding a packet at an intermediate node: 1) receive—the intermediate node receives the packet from the wireless medium; 2) route—the node determines the next-hop for this packet; 3) resend—the node resends the packet back to the wireless medium (towards the next hop). In today's multi-hop wireless network technology, these steps generally span across three OSI layers (physical, data-link, and network). The physical layer usually resides at the radio-frequency (RF) front-end of the NIC, the data-link layer (including MAC) usually resides in the NIC firmware and/or host computer's operating system (OS) kernel (device driver), and the network layer is almost always at the host computer's OS kernel and executed by the host computer's processing unit (CPU). Therefore, each forwarding action must involve RF, NIC, and CPU. For example, IP forwarding in MANET involves the following: when the packet arrives at the intermediate node, it traverses all three layers and is received by the IP input routine in OS kernel. The OS kernel then looks up the next hop address from the kernel IP forwarding table (often called route table). The packet than traverses all three layers again before being sent out for the next hop.

There are several inefficiencies (with respect to energy and latency) for this architecture. First, each packet must traverse the protocol stack merely to know the identity of the next hop neighbor. The processing involved for these operations at both the NIC and the CPU consume significant power. Second, if a node participates in the network, it cannot put itself in sleep mode to conserve energy, because the NIC and CPU must be powered on all times in anticipation of packet forwarding actions. Third, to identify the next hop, the packet must be transmitted in some form of data-link frame (such as MAC header). The framing incurs bandwidth overhead. Finally, since the protocol stack process is usually on a packet-by-packet basis, the node must buffer and receive the entire packet before handing it to the next layer. This can cause additional delay in packet forwarding through any intermediate node.

Therefore, what is needed is to conduct the entire packet forwarding action in one place—the physical layer (e.g., the RF module for a wireless network). This way, only the RF section needs to be powered on to complete a packet forwarding action. The rest of the node, including NIC and CPU, can remain in sleep mode and only respond when there is an incoming packet that is destined for that particular node.

(2) Description of Related Art

MANET routing has been implemented in the art using many different protocols. However, these routing protocols require the processing of the received packets in all three layers (PHY, MAC, and NET) of each intermediate node. What is needed is a routing protocol that proposes to use packet forwarding that is implemented entirely in the physical layer.

Multi-user Code Division Multiple Access (CDMA) has been studied regarding its applicability for multi-hop wireless networks. However, the prior art in this area focuses only on using CDMA as a multiplexing and multi-access tool. What is needed is using CDMA codes to construct a routing/forwarding scheme.

BRIEF SUMMARY OF THE INVENTION

The present invention provides a system and a method that overcomes the aforementioned limitations and fills the aforementioned needs by providing a method and apparatus for code-switching in wireless multi-hop networks.

In one embodiment, the present invention is a network comprising: a node capable of communicating with other nodes, the node comprising: a receiver; and a physical layer sub-module connected with the receiver, the physical layer sub-module comprising: a modulation processing module; and a code-switching assignment element, the code-switching assignment element having orthogonal codes, wherein the node receives a signal encoded in an orthogonal code from another node for handling the signal in accordance with the code-switching assignment element.

In another embodiment, the network further comprises an upper-layer sub-module connected with the physical layer sub-module.

In yet another embodiment, the code-switching assignment element is stored in a device selected from a group consisting of: field programmable gate array; flash memory; and a microcontroller.

In an additional embodiment, the receiver is selected from a group consisting of: a radio-frequency antenna; an optical receiver; and a network interface card.

In a further embodiment, the code-switching assignment element is a code-switching table.

In another embodiment, the orthogonal codes are selected from a group consisting of: gold codes; low density parity check codes; and different wavelengths of light.

An additional embodiment of the present invention is a method of transmitting data across a network comprising acts of: receiving a signal at a node encoded in a first orthogonal code; translating the signal in the first orthogonal code into a signal in a second orthogonal code in a physical layer of the node; and transmitting the signal in the second orthogonal code.

In another embodiment, the method further comprises acts of: receiving a second signal at a node encoded in a third orthogonal code; and processing the second signal at a data layer and a network layer of the node.

A further embodiment of the present invention is a method of data forwarding comprising acts of: transmitting a first signal modulated by a first orthogonal code; receiving the first signal at a first node having a first orthogonal code decoder; demodulating the first signal at the first node in a physical layer resulting in a decoded signal; modulating the decoded signal with a second orthogonal code resulting in a modulated signal; transmitting the modulated signal; and detecting the first signal at a physical layer of a second node having a second orthogonal code decoder as noise.

In yet another embodiment the method of data forwarding further comprises acts of: receiving the modulated signal at a physical layer of a third node; and processing the modulated signal at a data layer and a network layer of the node.

BRIEF DESCRIPTION OF THE DRAWINGS

The objects, features, and advantages of the present invention will be apparent from the following detailed descriptions of the preferred aspects of the invention in conjunction with reference to the following drawings, where.

DETAILED DESCRIPTION

Figure 1:
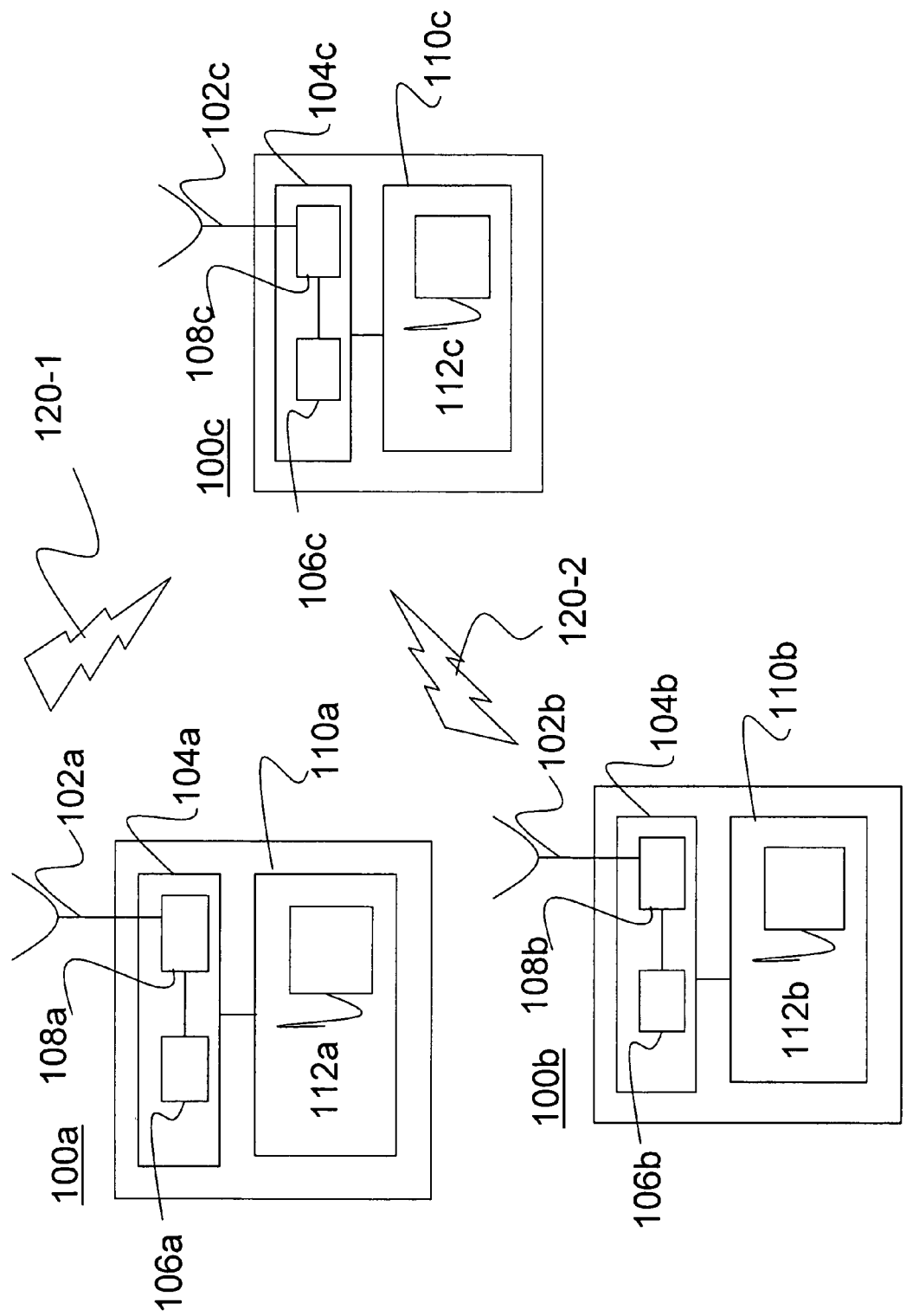
FIG. 1 depicts three nodes that may be present in a wireless, multi-hop network in accordance with the present invention.

The present invention relates to the field of code-switching in multi-hop wireless networks. More specifically, the present invention pertains to a method and apparatus that uses orthogonal codes as the forwarding labels in multi-hop forwarding. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that, unless explicitly stated otherwise, the figures included herein are illustrated diagrammatically and without any specific scale, as they are provided as qualitative illustrations of the concept of the present invention.

One skilled in the art will appreciate that the scope of the terms is intended to be construed with reference to this disclosure as a whole and with respect to the claims below. In order to provide a working frame of reference, a brief introduction is provided in the form of a narrative description of the present invention to give a conceptual understanding prior to developing the specific details. The introduction is followed by a detailed description of the elements in order to enable the reader to make and use the various embodiments of the invention without involving extensive experimentation.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each features disclosed are one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "act of" in the claims herein is not intended to invoke the provisions of 35 U.S.C. Section 112, Paragraph 6.

(1) System Overview

In one embodiment, a system and method is capable of utilizing code-switching in a multi-hop wireless network to enable highly efficient and low-energy multi-hop routing in ad-hoc networks and sensor networks. The basic idea is to use orthogonal codes as forwarding labels in multi-hop forwarding. One skilled in the art will appreciate that any set of orthogonal codes can be used, such that there is orthogonality between the members of the set. Examples of such orthogonal sets include gold codes, low density parity check (LDPC) codes, and different wavelengths of light for fiber-based systems. Each source and destination node pair is identified by a unique code, which may be pre-assigned, or dynamically re-used in a mobile network. A packet from the source node is first transmitted in a wireless channel by modulating the data stream with that specific orthogonal code. The orthogonality of the codes ensures that only the next-hop neighbor (as identified in the routing layer) can detect the signal transmission by correlating the orthogonal code with the transmitted signal. When this neighbor receives the signal and identifies the particular orthogonal code in use, it consults a pre-populated code-switching assignment element, e.g., a code-switching table, to determine the code to use for the next hop, and then proceeds to re-transmit the signal using the new code. This code-switching procedure is then repeated at each of the next hops until the packet reaches the intended destination (which is designated as another entry in the code-switching assignment element). One skilled in the art will appreciate that in the art code assignment is generally performed by referencing a table; however, the code assignment can be implemented in any manner that relates a first code to a second code. The code-switching assignment element at every node needs to be properly arranged so that, given any route in the network, the outgoing code is always a detectable incoming code at the next hop. Thus, the packet can route through the network from source to destination by switching codes at every hop along the way.

This entire forwarding process is performed at the physical layer. In one embodiment, the entire forwarding process is performed by a radio-frequency antenna or front-end of a transceiver. However, one skilled in the art will appreciate that in a wired network, the forwarding process may be performed by the NIC. Further, the wired or wireless network may be an optical network. In an optical network different colors of light may be used as the orthogonal coding. Thus, the forwarding process may be performed at the optical receiver. Therefore, most of the upper processing layers of the intermediate relay nodes can remain in sleep or idle mode, resulting in a non-trivial conservation of energy. Thus, the intermediate nodes behave simply like "dump" relay radios. In addition, this technique has the attractive features of lower latency, lower bandwidth overhead, and more secure communication.

(2) Details

Orthogonal codes, such as gold codes for code-division multiple access (CDMA) systems or low density parity check codes (LDPC) codes, are digital signals (or intelligence) that have the property that the codes can be mixed (or modulated) with a binary data stream of interest in such a way that the resulting mixture can only be separated if the same code (or decoding signal) is present at the receiving end. The codes are orthogonal because streams mixed with separate codes simply appear as noise to each other, and do not interfere to destroy the embedded intelligence that is imparted on the signal transmitted from the other. Thus, from the point of view of a receiver able to decode Code-1, signals sent with a code other than Code-1 appear as noise. Another example of orthogonal codes is different colors of light in an optical system.

One skilled in the art will appreciate that the actual process of embedding the code differs given the specific technology. For example, direct sequence CDMA uses a pseudo-nose (PN) chip code to modulate the data-modulated carrier wave. LDPC, on the other hand, embeds a codeword as part of the channel-coding mechanism. Thus, irrespective of the actual technique, if the codes are reasonably orthogonal, physical layer correlation techniques can be used to separate the mixtures. Thus, from a network perspective, the nodes can distinguish signals that are destined only for it, and not others.

The proposed code-switching technique assumes that there are many such distinct codes (for each reasonable source-destination flow), i.e., enough to support a network of moderate size. As mentioned earlier, many types of codes have these properties, and, thus any convenient variant can be used to implement code switching, as mentioned above.

FIG. 1 depicts three nodes 100a-c that may be present in a wireless multi-hop network. For simplicity's sake, the components of a single node 100a will be described. One skilled in the art will appreciate that each node 100a-c will have similar components. Node 100a comprises a receiver 102a connected with a physical layer sub-module 104a having a code-switching assignment element 106a connected with a modulation processing module 108a. Node 100a further comprises an optional upper-layer sub-module 110a connected with the physical layer sub-module 104a. One skilled in the art will appreciate that the optional upper-layer sub-module 110a comprises many components that are traditionally found in a communication node such as a processor sub-module 112a.

In one embodiment, the modulation processing device 108a modulates binary data with an orthogonal code selected from the code-switching assignment element 106a. The output of the modulation processing module 104a is then passed to the receiver 102a. In FIG. 1, both nodes 100a and 100b are transmitting, while node 100c is receiving. One skilled in the art will appreciate that this depiction is for simplicity only, and that nodes 100a-c may be equipped with RF transceivers to allow them to transmit and receive data.

Node 100a is transmitting data 120-1 modulated by a first orthogonal code, while node 100b is transmitting data 120-2 modulated by a second orthogonal code. Node 100c comprises a receiver 102c for receiving data transmitted by either node 100a or node 100b. In this example, node 100c is programmed with the first orthogonal code. The modulation processing module 104a receives a signal from the receiver 102c and demodulates the signal using the first orthogonal code. Thus, the node 100c will be able to decode the signal sent by node 100a since they use the same orthogonal code, but the signal from node 100b will look like noise to node 100c.

One skilled in the art will appreciate that there are many different ways implement the code-switching assignment element 106a. In one embodiment, a field-programmable gate array (FPGA) may be used. The FPGA could interface with a custom application-specific integrated circuit (ASIC) and RF components. In one embodiment, the FPGA could be software-reconfigurable (i.e., the code assignments could be dynamically updated via a programmability feature of the FPGA) and could execute the code switching essentially at hardware speeds. In another embodiment, general-purpose flash memories or microcontrollers with memory can perform the code assignment storage/switching functions.

Figure 2:
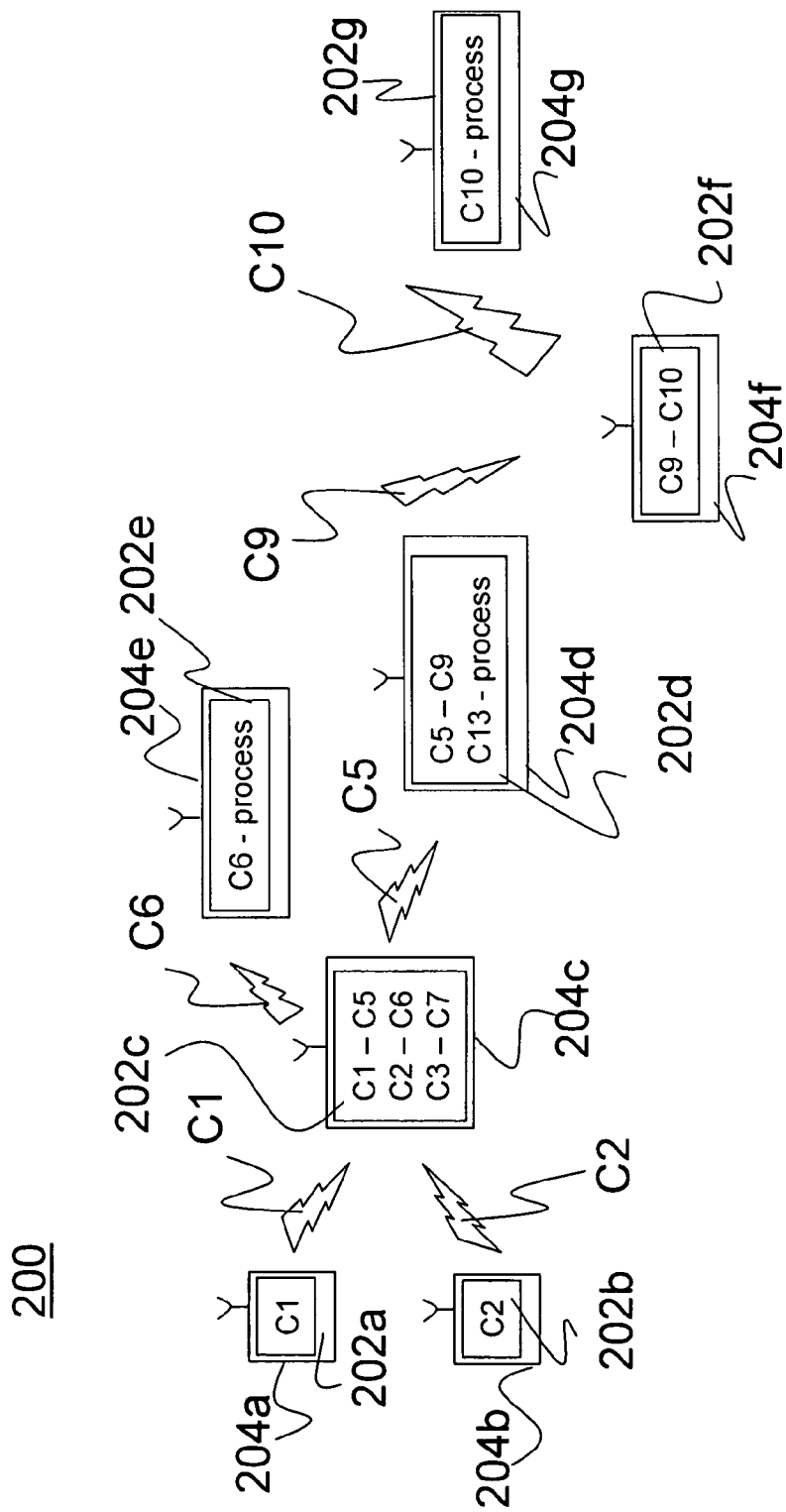
FIG. 2 illustrates the basic idea of code-switching in a multi-hop wireless network in accordance with the present invention.

FIG. 2 illustrates the basic idea of code-switching in a multi-hop wireless network. The multi-hop wireless network 200 comprises a plurality of nodes 204a-g. Each node has a code-switching assignment element 202a-g. Each node 204a-g also comprises the components described for each node in FIG. 1; however, these components are not shown in FIG. 2 for simplicity. When a packet is transmitted in the wireless medium, the signal is encoded (or spread, or multiplied, or carried) in a certain code. The receiver at each node 204a-g can detect a subset of codes and can receive signals encoded in one of those codes. In addition to separating the signal source, this code will also have significance in determining the route—the sequence of hops leading to the destination of the message. When an intermediate node receives a packet, i.e., successfully detects the code of the signal, it can switch to use another code to send the signal out. The new code should be one that is detectable at the intended next hop. If properly arranged, a packet can travel across the network from any source to any destination by switching codes at every hop along the way. This forwarding technique is called code-switching. The activity is entirely at the physical layer.

The enabling mechanism is a code-switching assignment element 202a-g at the physical layer sub-module of any node 204a-g. This table 202a-g is a mapping from one code to another. As depicted in FIG. 2, the code on the left is the incoming code—a code that this node's receiver can detect. The code on the right is the outgoing code—a code that can be used in transmitting a packet. Every node 204a-g will have its own code-switching assignment element 202a-g. Collectively, codes will be chained by these assignment elements 202a-g in such a way that any node 204a-g can reach any other node 204a-g (assuming a path does exist in the network).

Node 204c has a physical layer sub-module 104a (as shown in FIG. 1) having a code-switching assignment element 202c. The physical layer sub-module of node 204c detects three codes C1, C2, and C3. The physical layer sub-module of node 204c then utilizes the code-switching assignment element 202c to map code C1 into code C5, code C2 into code C6, and code C3 into code C7; node 204d maps code C5 into code C9 and if node 204d receives code C14, it process the information in code C14 by passing the information to the upper layer sub-module 110a (shown in FIG. 1).

In the example shown in FIG. 2, packet 1 is sent from node 204a to node 204g. Packet 1 leaves node 204a using code C1. Node 204c is the only neighbor of node 204a that can detect code C1, and packet 1 is thus picked up by node 204c. Node 204c then translates code C1 into code C5, according it node 204c's code-switching assignment element 202c, and sends it out again. The same process repeats at node 204d where code C5 is translated into code C9 and so on, until the packet reaches node 204g. Node 204g assigns a special meaning to incoming code C10—this packet is for node 204g itself. Thus, node 204g accepts this packet and passes it to the upper layer sub-module 110a (shown in FIG. 1), waking up the upper layers and host computer processing unit (CPU) if necessary. This way, packet 1 is forwarded from node 204a to node 204g by switching its code from code C1 to code C5, to code C9, to code C10. In another example, packet 2 is sent from node 204b to node 204e in the same way, switching code from code C2 to C6. One skilled in the art will appreciate that codes may be reused throughout the network provided that the nodes reusing the code are sufficiently far away from the nodes that first used the code so as not to cause an interference problem.

Code-switching in physical layer requires a multi-user detection receiver for intermediate nodes. This is because an immediate node will forward packets for different next hop neighbors, meaning that distinct incoming codes are required in the switching assignment element. Therefore, the receiver must be able detect and select multiple codes from input signal.

All codes used in the network must be orthogonal, so that a node can separate two signals when they are transmitted simultaneously. Input signal with a code undetectable at a node will not be received or just appear as "noise."

In one embodiment, an application programming interface (API) is provided for a host to update the code-switching assignment element at the node (only when necessary). For static multi-hop networks (e.g., sensor networks), codes can be pre-assigned and all code-switching assignment elements pre-populated before deployment. However, for dynamic networks (e.g., ad-hoc networks), code-switching assignment elements may need to be updated to reflect the topology and network-routing changes. These code-switching assignment elements may be updated through the API when MANET route daemon discovers a route change (a less frequent event).

(3) Advantages

The disclosed system and method has at least four advantages over current state-of-the-art techniques in multi-hop routing. First, it significantly reduces the processing and energy used to forward a packet. Since activity is limited entirely to the physical layer, the other processing functions of the intermediate node, such as the NIC back-end, the host CPU and auxiliaries can remain powered off (or in a low power idle mode). Furthermore, the processing that would normally be required in the higher layers (MAC and NET) to accomplish medium access and routing are totally eliminated.

Second, the disclosed system and method significantly reduces the latency incurred in forwarding packets through intermediate nodes, when compared with current state-of-art routing techniques. With current architectures, the entire packet must be received and processed by all the intermediate nodes involved in the routing (and all the layers up to the routing layer) before being identified as to the source/destination addresses. This incurs processing delays. In contrast, the forwarding method proposed herein can be on a symbol-by-symbol basis: a node can immediately resend a data packet after it detects the incoming code and looks up the corresponding outgoing code. That is, intermediate nodes need not buffer and wait for the entire packet to arrive to accomplish decoding. As a result, using this technique, a packet can route across the network with much greater efficiency and minimum delay, as opposed to current state of the art.

Third, the proposed technique uses much less overhead bandwidth compared with other current techniques because it eliminates link-layer framing (such as MAC headers). Since the outgoing code implicitly identifies the next hop, link-layer frames, such as preambles and MAC headers, are no longer necessary.

Finally, the disclosed system and method has an inherently more secure data payload than other state-of-the-art techniques, because the code used by the transmitting node is required by the receiving node to detect and decipher a modulated packet/symbol, and the exact sequence of codes is required to decipher the source/destination information. Furthermore, the source/destination information is not carried in each packet—one must know the exact sequence of codes to decipher that information. This means that one must obtain the hardware code-switching assignment elements in all nodes along the route, which is a forbiddingly difficult task.

What is claimed is:

1. A network comprising:
a node capable of communicating with other nodes, the node comprising:
  a receiver; and
  a physical layer sub-module connected with the receiver, the physical layer sub-module comprising:
    a modulation processing module; and
    a code-switching assignment element, the code-switching assignment element having orthogonal codes, wherein the orthogonal codes are selected from a group consisting of: gold codes and low density parity check codes; and
  wherein the physical layer sub-module receives a signal encoded in a first orthogonal code from another node for routing the signal at a physical layer in accordance with a second orthogonal code as provided by the code-switching assignment element; and
  wherein the physical layer sub-module detects the signal at a physical layer of a second node having a second orthogonal code decoder as noise; and
  wherein the node immediately transmits the signal encoded in the second orthogonal code after detecting the signal encoded in the first orthogonal code, such that the signal is not received and decoded, in its entirety, at a network layer of an intermediate node in the network prior to beginning routing of the signal encoded in the second orthogonal code.

2. The network of claim 1, further comprising an upper-layer sub-module connected with the physical layer sub-module.

3. The network of claim 1, wherein the code-switching assignment element is stored in a device selected from a group consisting of: field programmable gate array; flash memory; and a microcontroller.

4. The network of claim 1, wherein the receiver is selected from a group consisting of: a radio-frequency antenna; an optical receiver; and a network interface card.

5. The network of claim 1, wherein the code-switching assignment element is a code-switching table.

6. A method of transmitting data across a network comprising acts of:
  receiving a signal at a node encoded in a first orthogonal code;
  translating the signal in the first orthogonal code into a signal in a second orthogonal code in a physical layer of the node; and
  transmitting the signal in the second orthogonal code to another node;
  detecting the signal at a physical layer of a second node having a second orthogonal code decoder as noise;
  wherein the orthogonal codes are selected from a group consisting of: gold codes and low density parity check codes; and
  wherein the node immediately transmits the signal encoded in the second orthogonal code after detecting the signal encoded in the first orthogonal code, such that the signal is not received and decoded, in its entirety, at a network layer of an intermediate node in the network prior to beginning routing of the signal encoded in the second orthogonal code.

7. The method of claim 6, further comprising acts of:
  receiving a second signal at a node encoded in a third orthogonal code; and
  processing the second signal at a data layer and a network layer of the node.

8. A method of data forwarding comprising acts of:
  transmitting a first signal modulated by a first orthogonal code;
  receiving the first signal at a first node having a first orthogonal code decoder;
  demodulating the first signal at the first node in a physical layer resulting in a decoded signal;
  modulating the decoded signal in a physical layer with a second orthogonal code resulting in a modulated signal;
  transmitting the modulated signal; and
  detecting the first signal at a physical layer of a second node having a second orthogonal code decoder as noise;
  wherein the orthogonal codes are selected from a group consisting of: gold codes and low density parity check codes; and
  wherein the first node immediately transmits the signal encoded in the second orthogonal code after detecting the signal encoded in the first orthogonal code, such that the signal is not received and decoded, in its entirety, at a network layer of an intermediate node in the network prior to beginning routing of the signal encoded in the second orthogonal code.

9. The method of claim 8, further comprising acts of:
  receiving the modulated signal at a physical layer of a third node; and
    processing the modulated signal at a data layer and a network layer of the node.

* * * * *